United States Patent
Greenwood

[15] 3,656,022
[45] Apr. 11, 1972

[54] ALTERNATING CURRENT CIRCUIT BREAKER COMPRISING A SERIES REACTOR FOR SHAPING CURRENT AND VOLTAGE WAVES NEAR CURRENT ZERO

[72] Inventor: Allan N. Greenwood, Media, Pa.
[73] Assignee: General Electric Company
[22] Filed: Mar. 30, 1971
[21] Appl. No.: 129,391

[52] U.S. Cl. ............................317/11 C, 317/20, 307/99, 307/137
[51] Int. Cl. ..........................H02h 7/22, H02h 3/08
[58] Field of Search ..................317/11 B, 11 C, 11 R, 20; 307/99, 134, 136, 137; 200/144 AP; 335/227

[56] References Cited

UNITED STATES PATENTS 3,489,950  1/1970  Mishkovsky......................317/11 B
3,390,305  6/1968  Greenwood.......................317/11

*Primary Examiner*—J. D. Miller
*Assistant Examiner*—Harvey Fendelman
*Attorney*—J. Wesley Haubner, William Freedman, Frank L. Neuhauser, Oscar B. Waddell and Joseph B. Forman

[57] ABSTRACT

Discloses an a-c circuit breaker comprising the series combination of a reactor and a circuit interrupter that opens in response to overcurrents. The reactor saturates during a severe overcurrent and then comes out of saturation just prior to current zero to force the arcing current to decay at a much lower rate during this latter period than during the immediately preceding period. The reactor is prevented from saturating during normal currents by an air gap in its core which is bridged in response to an overcurrent by a magnetizable armature.

5 Claims, 2 Drawing Figures

Patented April 11, 1972

3,656,022

INVENTOR:
ALLAN N. GREENWOOD,
BY William Freedman
ATTORNEY

ALTERNATING CURRENT CIRCUIT BREAKER COMPRISING A SERIES REACTOR FOR SHAPING CURRENT AND VOLTAGE WAVES NEAR CURRENT ZERO

This invention relates to an alternating current circuit breaker comprising the series combination of a reactor and a circuit interrupter which opens in response to overcurrents. The invention relates more particularly to a circuit breaker of this type in which the reactor saturates during a severe overcurrent and, in the course of such overcurrent, comes out of saturation during the period immediately prior to current zero to force the arcing current through the interrupter to decay at a much lower rate during this period than during the immediately preceding period. This decreased rate of current decay just prior to current zero increases the probability that the interrupter will be able to successfully complete circuit interruption at current zero.

I am aware that it has heretofore been proposed to use a reactor connected in series with a circuit interrupter to force the arcing current to decay at the desired relatively low rate during the period immediately prior to current zero. See for example my U.S. Pat. No. 3,390,305, assigned to the assignee of the present invention, where such a reactor is present in a d-c circuit. This reactor is maintained saturated by normal d-c current in the circuit. However, when such a reactor is present in an a-c circuit, the reactor tends to be driven into and out of saturation during the passage of normal alternating currents therethrough; and this influences, often objectionably, the shape of the normal alternating current wave.

An object of my invention is to provide, in an a-c circuit breaker, a saturable reactor that is capable of effecting the desired current wave shaping immediately prior to current zero under fault conditions, but is prevented from being saturated by the flow therethrough of normal currents.

For a better understanding of the invention, reference may be had to the following description taken in conjunction with the accompanying drawing, wherein.

Figure 1:
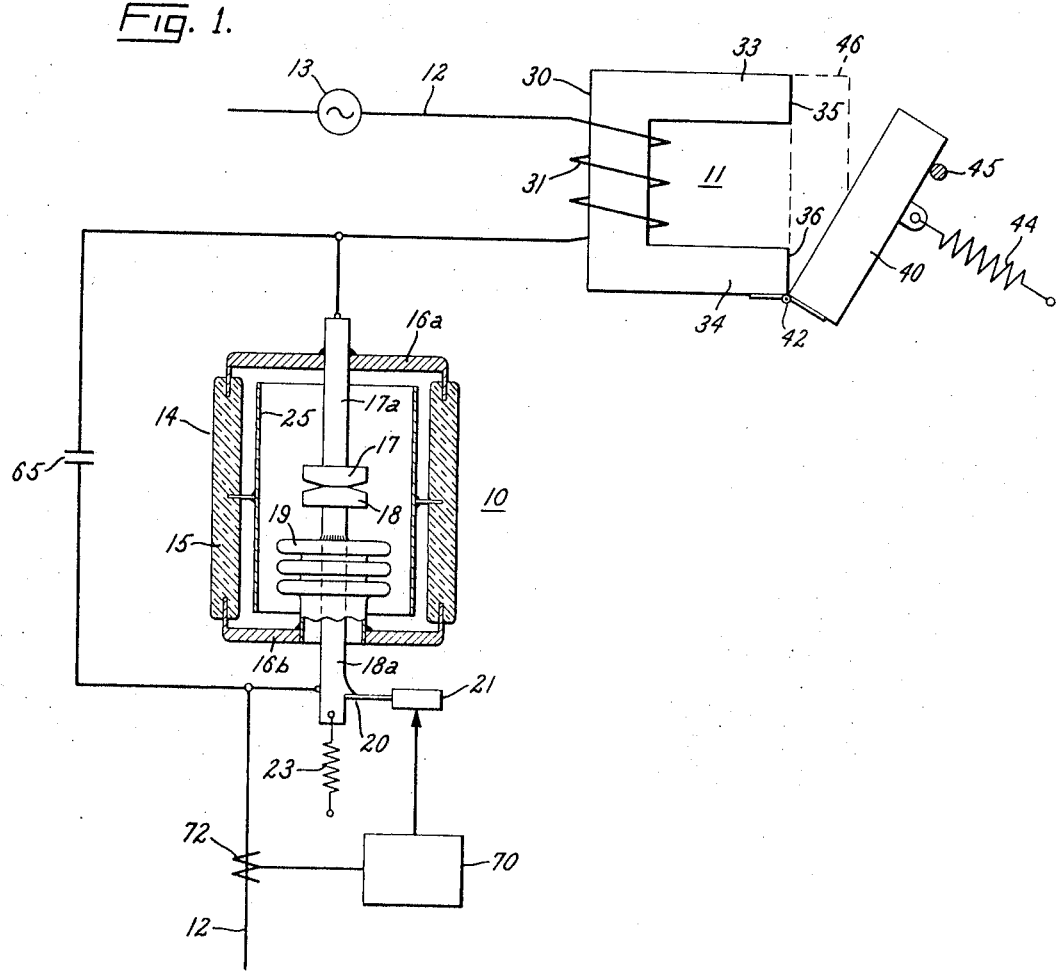
FIG. 1 is a schematic showing of a circuit breaker embodying one form of the invention.

Referring now to FIG. 1, there is shown an electric circuit breaker that comprises the series combination of a vacuum interrupter 10 and a saturable reactor 11 connected in a high voltage power circuit that includes an alternating current power source 13. The vacuum interrupter is of a conventional form and comprises a highly evacuated envelope 14 comprising a casing 15 of insulating material and a pair of end caps 16a and 16b sealed thereto. Disposed within the envelope 14 are separable contacts 17 and 18. Contact 17 is a stationary contact fixed to a stationary conductive contact rod 17a, and contact 18 is a movable contact fixed to a movable conductive contact rod 18a. Contact rod 18a projects freely through lower end cap 16b. A flexible metallic bellows 19 is provided between contact rod 18a and end cap 16b to provide a flexible seal therearound that allows for vertical movement of contact rod 18a without impairing the vacuum inside the envelope.

The contacts are held in the engaged, or closed, position shown by means of a suitable trip latch 20 controlled by a tripping solenoid 21. When the solenoid is operated to release latch 20, an opening spring 23 rapidly drives movable contact rod 18a downwardly to separate the contacts. Such contact separation draws an arc between the contacts, and this arc persists until a natural current zero is reached, at which time the arc vanishes and the gap between the contacts begins to recover its dielectric strength. For condensing the arcing products to aid in dielectric strength recovery, a tubular metal shield 25, electrically isolated from both contacts and spaced therefrom, is provided around the arcing region.

Interruption is successfully completed, however, only if the gap between contacts 17 and 18 can recover its dielectric strength sufficiently rapidly to withstand the recovery voltage that is quickly built up across the gap when the current zero point is reached. Two major factors that have an important effect on whether the interrupter will be able to successfully withstand the recovery voltage are (1) the rate at which current decays immediately prior to current zero and (2) the rate at which the recovery voltage builds up when current zero is reached. Generally speaking, the lower each of these rates, the greater is the likelihood of successful interruption.

As will soon be explained in more detail, I reduce both of these rates by providing the saturable reactor 11 in series with the interrupter 10. This reactor 11 comprises a laminated iron core 30 and a coil 31 linked to the core and connected in series with the interrupter. The illustrated core 30 is of generally U-shape and comprises spaced-apart legs 33 and 34 terminating in pole faces 35 and 36, respectively. The space between these pole faces 35 and 36 may be thought of as an air gap in the magnetic circuit of the reactor.

For bridging this air gap when the instantaneous current through coil 31 reaches a predetermined level, there is provided a laminated iron armature 40 which is pivotally supported on leg 34 by a suitable hinge 42. Armature 40 is normally held spaced from pole face 35 by a tension spring 44 biasing the armature clockwise against the stop 45.

The magnetic field developed in core 30 by current through coil 31 tends to pivot the armature counterclockwise into a dotted line position 46 where it will bridge the air gap between the pole faces 35 and 36; but so long as the current is below the aforesaid predetermined level, spring 44 is capable of preventing such movement. When, however, the current reaches this predetermined level, the armature is rapidly pivoted counterclockwise into its dotted line position to bridge the air gap.

Prior to this movement of the armature to its dotted line bridging position, the air gap in the magnetic circuit prevents the core 30 from saturating. When the armature has moved into its bridging position, the air gap is no longer present to prevent saturation, and, accordingly, the armature rapidly saturates in response to the relatively high current that is then flowing through coil 31.

Figure 2:
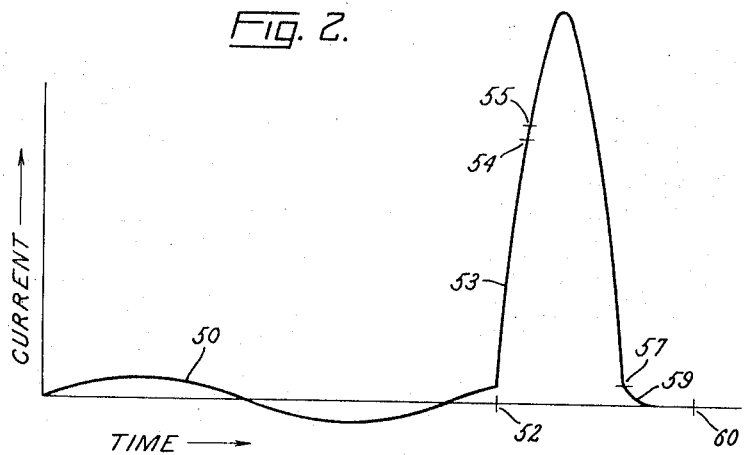
FIG. 2 is a time-current graph illustrating the sequence of events occurring during operation of the circuit breaker of FIG. 1.

This sequence of events is depicted in FIG. 2, where the normal rated continuous current through the interrupter is depicted at 50. A fault on power circuit 12 downstream from the interrupter is assumed to occur at an instant 52, which fault results in a rapid increase in current, as shown at 53. When the current reaches a level of 54, armature 40 has moved into its dotted line bridging position. As the current continues to increase, the magnetic circuit of the reactor rapidly saturates at a current level 55. The magnetic circuit remains in saturation for the remainder of the current loop until the current has decreased to a level 57 just before current zero. At this point, the magnetic circuit comes out of saturation, which is the equivalent of introducing a large inductance into the circuit at this instant. This inductance opposes the continued decay of current, forcing current decay during this interval 59 to occur at a much lower rate than during the immediately preceding period.

Because of inertia and more especially because the current to hold in the armature is much smaller than the current to pull it in, the armature 40 remains in its dotted line bridging position until after the current has reached zero and for a short time thereafter, retained by the current flowing into capacitor 65. At about the instant 60 in FIG. 2, armature 40 drops out, returning to its position of FIG. 1 under the influence of spring 44. It is important that the armature remain in its bridging position until current zero is reached because when the armature is in this position, the effective permeability of the magnetic circuit is relatively high and thus the inductance of the reactor is relatively high, thus further flattening the wave form just prior to current zero.

Interruption is successfully completed at this current zero only if the gap that is then present between the contacts 17 and 18 can successfully withstand the recovery voltage transient that immediately builds up across the gap at current zero. The rate of rise of this recovery voltage transient is reduced somewhat by a capacitor 65 connected across the interrupter 10, this rate of rise corresponding to the rate at which the capacitor 65 can be charged by the voltage source 13 of the circuit at current zero. The reactor 11 reduces the rate at which the capacitor can be charged since it constitutes a relatively high impedance in series with the capacitor. The fact that the armature 40 of the reactor has not yet dropped out during this interval contributes to this relatively high impedance and hence to the reduced rate of rise of the recovery voltage transient. As previously pointed out, the reduced rate of rise of the recovery voltage transient increases the probability that interruption will be successfully completed at current zero since more time is available for the intercontact gap to recover its dielectric strength.

The decreased rate of current decay prior to current zero is believed to improve the current-interrupting ability because it allows more time for the arcing products to disperse from the arcing region and to condense on vapor-condensing shield 25 and also more time for the contacts to cool following exposure to the high instantaneous values of arcing current. The more complete condensation and the cooler contacts contribute to a higher rate of dielectric recovery at current zero.

A major advantage of using a reactor with an air gap in its core is that during the passage of normal rated continuous current through the interrupter, the reactor remains unsaturated and therefore has no significant effect on the wave form of such normal continuous current. Despite this air gap at normal currents, however, the reactor is able to saturate rapidly when the current rises to a value (55) in excess of normal rated continuous current and is able to remain saturated until a much lower current (57) is reached shortly before the instant of current zero.

It is to be understood that the reactance imposed by the reactor during the interval 59 should be sufficiently high to significantly flatten the current wave during this interval (as compared to the waveform in a circuit in which the reactor is absent). The invention is not intended to comprehend circuits in which any reactance present is so low as to introduce no significant change in waveform during this period just preceding current zero.

My invention, in its broader aspects, applies to circuit breakers in which circuit interrupters other than vacuum type interrupters are utilized, for example, circuit interrupters of the gas-blast type. The invention is especially applicable, however, to vacuum-type circuit interrupters because with such circuit interrupters, it is feasible to complete circuit interruption at the first current zero following contact separation if contact separation occurs well ahead of current zero. The vacuum interrupter requires only a very short gap to effect circuit interruption, and this gap length becomes even shorter and more feasible to consistently attain at the first current zero if reactor 10 is present to shape the current and voltage waves near current zero in a manner to render interrupting conditions less onerous, as described hereinabove.

A circuit application in which my invention is especially useful is that shown and claimed in U.S. Pat. No. 3,553,354-Kotos, assigned to the assignee of the present invention. In the Kotos patent, control means is provided for timing the tripping signal so that contact separation occurs at about the instant of peak current, or slightly later during a major loop of fault current. In such an application, only a relatively short time is available for the contacts to move apart an effective interrupting distance before current zero. The reactor 10, by flattening the current wave at 59, slightly lengthens the available time to current zero to permit a longer intercontact gap and also, for the other reasons set forth hereinabove, improves the interrupting conditions prevailing at current zero. Accordingly, with my reactor 10 present there is a greater probability that successful interruption will occur at the first current zero following contact separation when the Kotos control is employed. The control for timing the tripping signal is schematically indicated at 70 in FIG. 1 deriving its input information from the power circuit 12 through suitable sensing means schematically shown at 72. This current sensing means preferably comprises the pulse current transformer 32 and the linear coupler 60 of the Kotos patent.

While I have shown and described a particular embodiment of my invention, it will be obvious to those skilled in the art that various changes and modifications may be made without departing from my invention in its broader aspects; and I, therefore, intend herein to cover all such changes and modifications as fall within the true spirit and scope of my invention.

What I claim as new and desire to secure by Letters Patent of the United States is:

1. In an electric circuit breaker for an a-c circuit,
   a. a circuit interrupter having a predetermined continuous current rating and comprising a pair of separable contacts,
   b. means responsive to an overcurrent for separating said contacts upon the occurrence of an overcurrent in said circuit, thereby establishing an arc between said contacts,
   c. means for causing current through said arc during a severe overcurrent to decay at a much lower rate immediately prior to current zero than during the immediately preceding period comprising, in series with said contacts, a reactor that saturates when the instantaneous current during an overcurrent is high and comes out of saturation during the period immediately prior to current zero; said lower rate of decay prevailing for a sufficient period to facilitate interruption at current zero,
   d. said saturable reactor comprising a magnetizable core having a gap therein and an armature that is attracted to said core to bridge said gap when an overcurrent passes through said reactor,
   e. and means for preventing saturation of said reactor by currents within said continuous current rating comprising means for preventing said armature from bridging said gap during the passage of said latter currents through said reactor.

2. The circuit breaker of claim 1 in which said circuit interrupter is a vacuum-type circuit interrupter comprising a highly evacuated envelope in which said separable contacts are located.

3. The circuit breaker of claim 1 in which a capacitor is connected in parallel with said interrupter and in series with said reactor to reduce the rate of rise of the recovery voltage transient at current zero, said reactor being located on the source side of said circuit interrupter so that charging of said capacitor at current zero takes place through said reactor.

4. The circuit breaker of claim 1 in which said armature after moving into said gap-bridging position in response to an overcurrent remains in said gap bridging position until after the instantaneous current through said interrupter has reached current zero.

5. The circuit breaker of claim 2 in which trip-controlling means is provided for causing separation of the interrupter contacts during interruption to occur during a current loop at an instant sufficiently prior to the current zero at the end of said loop to consistently complete circuit interruption at said latter current zero.

* * * * *